(No Model.)
L. R. STAGNER.
COMBINED RAKE AND FORK.
No. 381,594. Patented Apr. 24, 1888.
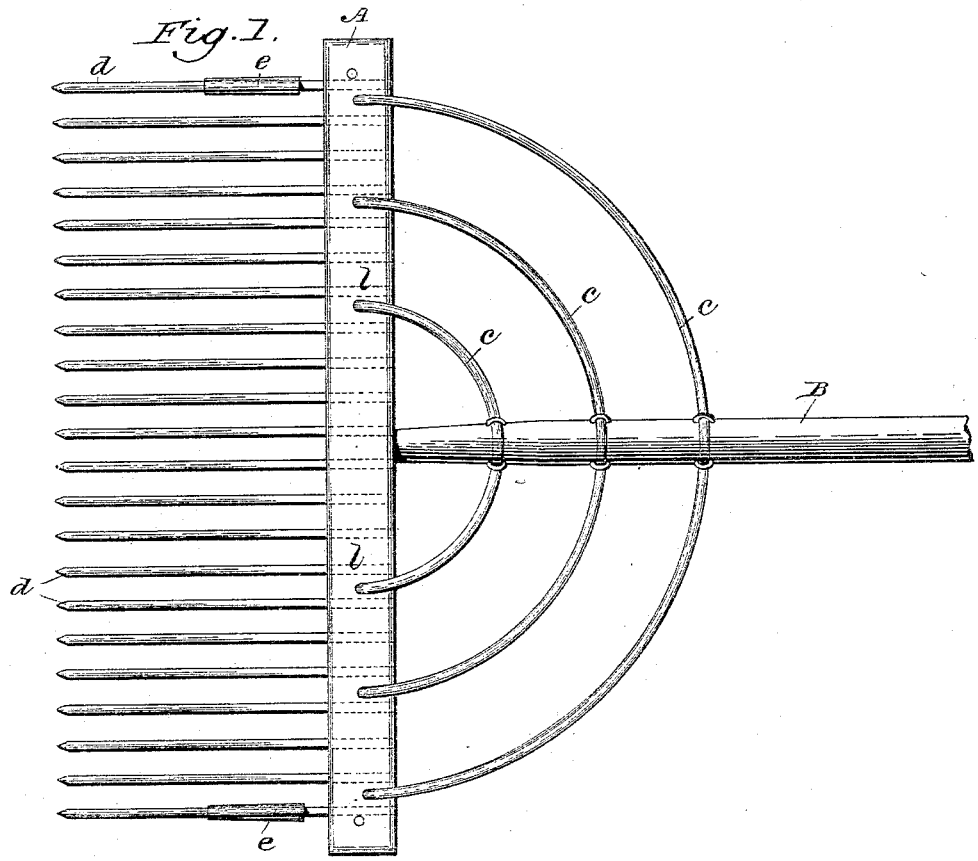
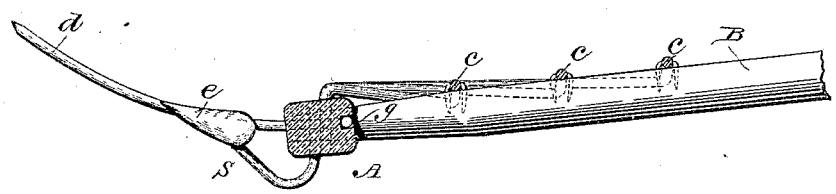
Witnesses.
Inventor.
Lytle R. Stagner
by
Benj. R. Catlin. Attorney.

United States Patent Office.

LYTLE R. STAGNER, OF MARSHALL, MISSOURI.

COMBINED RAKE AND FORK.

SPECIFICATION forming part of Letters Patent No. 381,594, dated April 24, 1888.

Application filed October 15, 1887. Serial No. 252,513. (No model.)

*To all whom it may concern:*

Be it known that I, LYTLE R. STAGNER, a citizen of the United States, residing at the city of Marshall, in the county of Saline and State of Missouri, have invented a new and useful Implement to be used for the Purposes of a Combined Rake and Fork, of which the following is a specification.

My invention relates to a combined rake and fork for farm and lawn purposes.

The object of the invention is to rake grass, hay, straw, or trash by pushing the fork or implement in front of the operator and passing its teeth under the material. When the device is full, it can be used as a fork and the material pitched onto a wagon, as with an ordinary fork.

The invention can also be used as an ordinary rake by holding the same in a vertical position.

Figure 1 represents a plan, and Fig. 2 represents a side, view of the combined rake and fork.

Slightly curved teeth are indicated by letters $d\ d\ d$.

A indicates a wood or metal cross-head.

$c\ c\ c$ are wire braces or bows, and B is a wooden handle.

The steel teeth pass through the cross head A, as shown by dotted lines, and the ends are secured in groove $g$ on the rear of the cross-head, as indicated in Fig. 2. The ends of the wire braces $c\ c\ c$ pass down through the cross-head A and are riveted on the under side. They are fastened to the handle B by wires or staples secured in the handle, as indicated in the drawings. The slides or shoes S are intended to govern the height of the teeth when the implement rests on the ground to carry the cross-head clear of the surface. They are fastened to the two outside teeth either by wrapping with wire and then soldering, as indicated at $e$, or by splitting the outside teeth and securing the parts to the end of the cross-head in suitable manner. The cross-head may be enlarged for this purpose, if necessary. The ends of these slides, passing through the ends of the cross-head at right angles to the teeth, are secured therein and tend to prevent the accidental splitting of the head by the leverage of the teeth. The braces $c\ c$ also strengthen the head in like manner. In practice they are intended to be placed sufficiently near each other to arrest and hold lawn-grass or other fine material.

The invention is not confined to any particular number of these braces, it being only essential that they shall subserve the purpose of a pan or receptacle, as indicated. The particular method of securing this receptacle to the handle and cross-head is not essential. It is important, however, that the teeth and receptacle should be in nearly the same plane, so that it can be emptied by pitching. It is also important that some form of slide should be employed to keep the cross bar from obstructing the passage of the teeth along the surface of the ground. The particular number of teeth is not essential, provided they are placed sufficiently near together to hold fine material like lawn-grass.

I am aware that receptacles for holding straw or other material received by gathering-teeth have been employed, and that slides or shoes are not broadly new, and, further, that forks have been provided with two cross-bars, and such constructions I do not claim.

Having thus described my invention, what I desire to claim and secure by Letters Patent is—

1. The herein-described implement, consisting of the handle, the cross-head, the teeth, the receptacle made distinct from the teeth, and slides, said slides being secured at one end to a tooth and at the other secured in the cross-head transversely to the teeth, and the teeth and receptacle being arranged approximately in the same plane, whereby the device can be pushed along upon the slides to accumulate a load upon the teeth and receptacle, and then used as a fork.

2. The herein-described implement, consisting of the handle, the cross-head, the teeth, receptacle, and slides, the teeth and receptacle being arranged approximately in the same plane and the ends of the slides passed through the cross-heads at right angles to the same and secured therein, the other end being secured to teeth, substantially as specified.

LYTLE R. STAGNER.

Witnesses:
 DEAN D. DUGGINS,
 J. T. FISHER.